(12) United States Patent
Tremblay

(10) Patent No.: US 6,374,351 B2
(45) Date of Patent: *Apr. 16, 2002

(54) SOFTWARE BRANCH PREDICTION FILTERING FOR A MICROPROCESSOR

(75) Inventor: Marc Tremblay, Menlo Park, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/829,525

(22) Filed: Apr. 10, 2001

Related U.S. Application Data

(63) Continuation of application No. 09/204,792, filed on Dec. 3, 1998.

(51) Int. Cl.⁷ .............................................. G06F 15/00
(52) U.S. Cl. ...................................................... 712/239
(58) Field of Search ................................ 712/216, 233, 712/234, 236, 237, 238, 239, 240, 241

(56) References Cited

U.S. PATENT DOCUMENTS

| | | | |
|---|---|---|---|
| 4,370,711 A | 1/1983 | Smith | 364/200 |
| 4,435,756 A | 3/1984 | Potash | 364/200 |
| 5,564,118 A | 10/1996 | Steely, Jr. et al. | 712/240 |
| 5,655,122 A | 8/1997 | Wu | 717/5 |
| 5,802,602 A | 9/1998 | Rahman et al. | 711/204 |
| 5,805,876 A | 9/1998 | Bose et al. | 712/234 |
| 5,848,269 A | 12/1998 | Hara | 395/586 |
| 5,928,358 A | 7/1999 | Takayama et al. | 712/239 |
| 5,933,628 A | 8/1999 | Chang | 712/233 |
| 6,115,809 A * | 9/2000 | Mattson, Jr. et al. | 712/239 |

* cited by examiner

Primary Examiner—John A. Follansbee
(74) Attorney, Agent, or Firm—Skjerven Morrill MacPherson LLP; Shireen Irani Bacon

(57) ABSTRACT

The present invention provides software branch prediction filtering for a microprocessor. In one embodiment, a method for a software branch prediction filtering for a microprocessor includes determining whether a branch is "easy" to predict, and predicting the branch using software branch prediction if the branch is easy to predict. Otherwise (i.e., the branch is "hard" to predict), the branch is predicted using hardware branch prediction. Accordingly, more accurate but space-limited hardware branch prediction resources are conserved for hard-to-predict branches.

36 Claims, 4 Drawing Sheets

SOFTWARE BRANCH PREDICTION FILTERING FOR A MICROPROCESSOR

CROSS-REFERENCE TO RELATED APPLICATIONS

This application is a continuation of U.S. patent application Ser. No. 09/204,792, filed Dec. 3, 1998, and entitled, "Software Branch Prediction Filtering For A Microprocessor," and naming Marc Tremblay as the inventor, the application being incorporated herein by reference in its entirety.

This application relates to application Ser. No. 09/204,480, filed on even date herewith, entitled "A Multiple-Thread Processor For Threaded Software Applications" and naming Marc Tremblay and William Joy as inventors, the application being incorporated herein by reference in its entirety.

FIELD OF THE INVENTION

The present invention relates generally to microprocessors, and more particularly, to branch prediction for a microprocessor.

BACKGROUND

Reduced Instruction Set Computing (RISC) microprocessors are well known. RISC microprocessors are characterized by a smaller number of instructions, which are relatively simple to decode, and by having all arithmetic/logic operations be performed register-to-register. RISC instructions are generally of only one length (e.g., 32-bit instructions). RISC instruction execution is of the direct hardwired type, as opposed to microcoding. There is a fixed instruction cycle time, and the instructions are defined to be relatively simple so that each instruction generally executes in one relatively short cycle.

A RISC microprocessor typically includes an instruction for a conditional branch operation. I.e., if a certain condition is present, then branch to a given location. It is known that a relatively small number of branch operations cause most of the branch mispredictions. For example, it has been suggested that 80 percent of the branch mispredictions result from 20 percent of the branch instructions for a given processor. Other branch operations are relatively easy to predict. For example, if an array access is preceded by a check for a valid array access, the check for a valid array access is accomplished in a typical RISC microprocessor by executing multiple conditional branches. These branches are generally easy to predict.

SUMMARY

Speed of execution is highly dependent on the sequentiality of the instruction stream executed by the microprocessor. Branches in the instruction stream disrupt the sequentiality of the instruction stream executed by the microprocessor and generate stalls while the prefetched instruction stream is flushed and a new instruction stream begun.

Accordingly, the present invention provides software branch prediction filtering for a microprocessor. For example, the present invention provides a cost-effective and high performance implementation of software branch prediction filtering executed on a microprocessor that performs branch operations. By providing the software branch prediction filtering, many easy-to-predict branches can be eliminated from a hardware-implemented branch prediction table thereby freeing up space in the branch prediction table that would otherwise be occupied by the easy-to-predict branches. In other words, easy-to-predict branches waste entries in a limited-size branch prediction table and, thus, are eliminated from the branch prediction table. This robust approach to software branch prediction filtering provides for improved branch prediction, which is desired in various environments, such as a Java™ computing environment. For example, this method can be used for various instruction sets such as Sun Microsystems, Inc.'s UltraJava™ instruction set.

In one embodiment, a method for software branch prediction filtering for a microprocessor includes determining whether a conditional branch operation is "easy"-to-predict and predicting whether to execute the branch operation based on software branch prediction. However, "hard"-to-predict branches are predicted using a hardware branch prediction (e.g., a limited size hardware branch prediction table).

Other aspects and advantages of the present invention will become apparent from the following detailed description and accompanying drawings.

DETAILED DESCRIPTION

The present invention provides software branch prediction filtering for branch operations for a microprocessor. In one embodiment, software branch prediction filtering uses hardware branch prediction only for "hard"-to-predict branches (a branch in which historical operation of the branch taken is important in determining whether the branch will be taken this time, e.g., an if . . . then statement) and uses software branch prediction for "easy" to prediction branches (a branch in which the history is not important in determining whether the branch will be taken for this particular branch, e.g., a loop). For example, the branch instruction can be used in a computing environment in which compiled programs include a significant number of branch operations, such as in a Java™ computing environment or in a computing environment that is executing compiled "C" programs.

For example, branch mispredictions generally slow down Java™ code executing on a typical microprocessor, which is due to the time wasted fetching the branched to instruction (s). Even with advanced compiler optimizations, it is difficult to eliminate all such branch mispredictions. Well-known Just-In-Time (JIT) Java™ compilers that generate software branch predictions for a typical Reduced Instruction Set Computing (RISC) microprocessor are currently about 75% accurate. Current hardware branch prediction is more accurate at about 85–93% accurate. Hardware branch prediction is typically implemented using a hardware branch prediction table. Because the hardware branch prediction table is limited in size (e.g., 512 entries), this approach is not desirable if there are a significant number of branches (e.g., more than 1000 branches) that can lead to aliasing effects (e.g., two different branches sharing the same entries will corrupt each others prediction state).

The present invention solves this problem by providing a branch instruction that includes a bit for indicating whether the branch is easy to predict or hard to predict in accordance with one embodiment. If the branch is hard to predict, then hardware branch prediction is used. Otherwise, software branch prediction is used. Thus, the more accurate hardware branch prediction is efficiently reserved for hard-to-predict branches. For example, a compiler can determine whether a branch is labeled as hard to predict or easy to predict (e.g., about 80% of the branches can be labeled easy to predict, and mechanisms may be added to update or modify these predictions based on mispredictions, as further discussed below).

Figure 1:
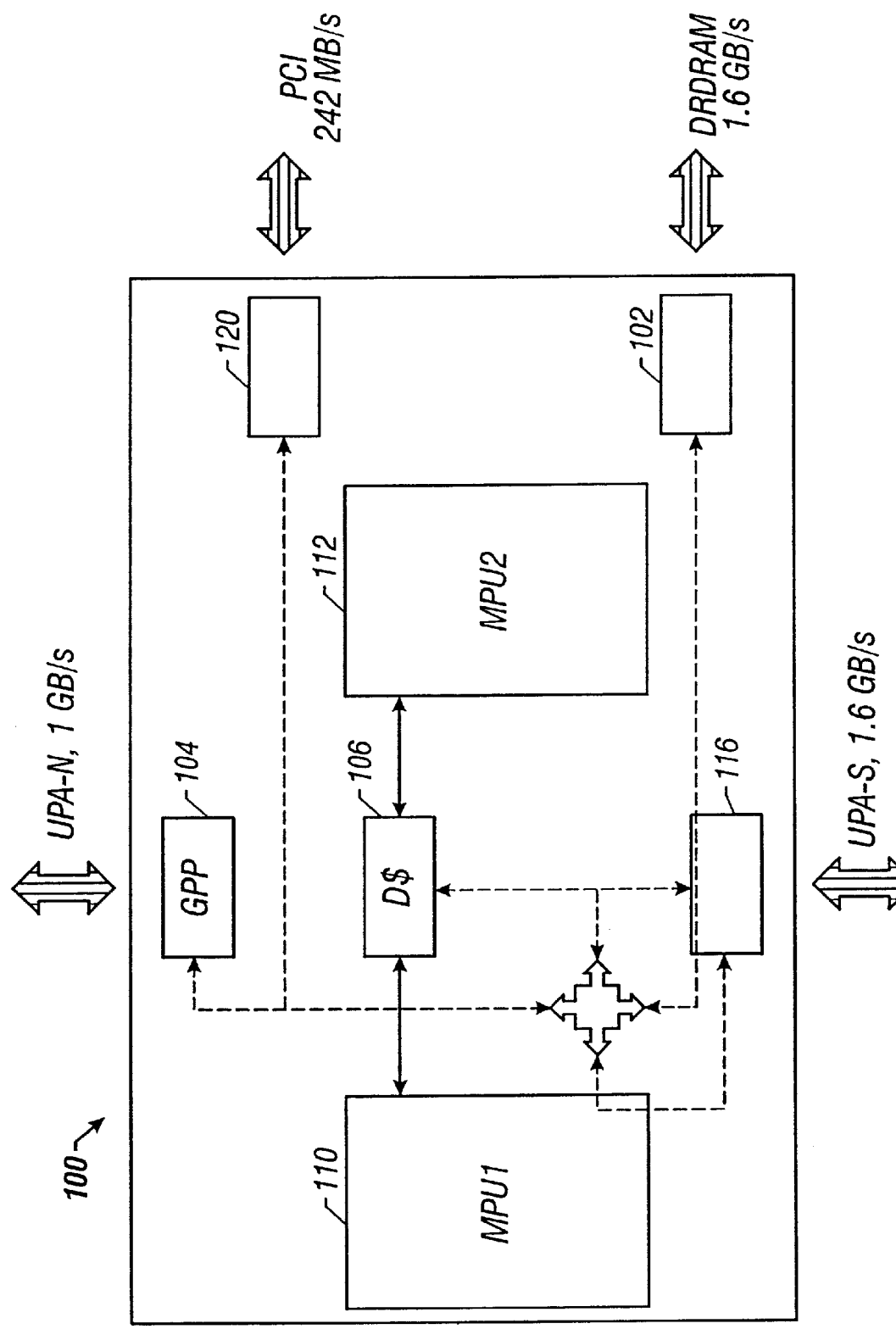
FIG. 1 is a schematic block diagram illustrating a single integrated circuit chip implementation of a processor in accordance with an embodiment of the present invention.

Referring to FIG. 1, a schematic block diagram illustrates a single integrated circuit chip implementation of a processor 100 that includes a memory interface 102, a geometry decompressor 104, two media processing units 110 and 112, a shared data cache 106, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels to manage multiple high-bandwidth data streams efficiently and with a low response time. The interface controllers include a an UltraPort Architecture Interconnect (UPA) controller 116 and a peripheral component interconnect (PCI) controller 120. The illustrative memory interface 102 is a direct Rambus dynamic RAM (DRDRAM) controller. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112.

The UPA controller 116 is a custom interface that attains a suitable balance between high-performance computational and graphic subsystems. The UPA is a cache-coherent, processor-memory interconnect. The UPA attains several advantageous characteristics including a scaleable bandwidth through support of multiple bused interconnects for data and addresses, packets that are switched for improved bus utilization, higher bandwidth, and precise interrupt processing. The UPA performs low latency memory accesses with high throughput paths to memory. The UPA includes a buffered cross-bar memory interface for increased bandwidth and improved scaleability. The UPA supports high-performance graphics with two-cycle single-word writes on the 64-bit UPA interconnect. The UPA interconnect architecture utilizes point-to-point packet switched messages from a centralized system controller to maintain cache coherence. Packet switching improves bus bandwidth utilization by removing the latencies commonly associated with transaction-based designs.

The PCI controller 120 is used as the primary system I/O interface for connecting standard, high-volume, low-cost peripheral devices, although other standard interfaces may also be used. The PCI bus effectively transfers data among high bandwidth peripherals and low bandwidth peripherals, such as CD-ROM players, DVD players, and digital cameras.

Two media processing units 110 and 112 are included in a single integrated circuit chip to support an execution environment exploiting thread level parallelism in which two independent threads can execute simultaneously. The threads may arise from any sources such as the same application, different applications, the operating system, or the runtime environment. Parallelism is exploited at the thread level since parallelism is rare beyond four, or even two, instructions per cycle in general purpose code. For example, the illustrative processor 100 is an eight-wide machine with eight execution units for executing instructions. A typical "general-purpose" processing code has an instruction level parallelism of about two so that, on average, most (about six) of the eight execution units would be idle at any time. The illustrative processor 100 employs thread level parallelism and operates on two independent threads, possibly attaining twice the performance of a processor having the same resources and clock rate but utilizing traditional non-thread parallelism.

Thread level parallelism is particularly useful for Java™ applications which are bound to have multiple threads of execution. Java™ methods including "suspend", "resume", "sleep", and the like include effective support for threaded program code. In addition, Java™ class libraries are thread-safe to promote parallelism. Furthermore, the thread model of the processor 100 supports a dynamic compiler which runs as a separate thread using one media processing unit 110 while the second media processing unit 112 is used by the current application. In the illustrative system, the compiler applies optimizations based on "on-the-fly" profile feedback information while dynamically modifying the executing code to improve execution on each subsequent run. For example, a "garbage collector" may be executed on a first media processing unit 110, copying objects or gathering pointer information, while the application is executing on the other media processing unit 112.

Although the processor 100 shown in FIG. 1 includes two processing units on an integrated circuit chip, the architecture is highly scaleable so that one to several closely-coupled processors may be formed in a message-based coherent architecture and resident on the same die to process multiple threads of execution. Thus, in the processor 100, a limitation on the number of processors formed on a single die thus arises from capacity constraints of integrated circuit technology rather than from architectural constraints relating to the interactions and interconnections between processors.

Figure 2:
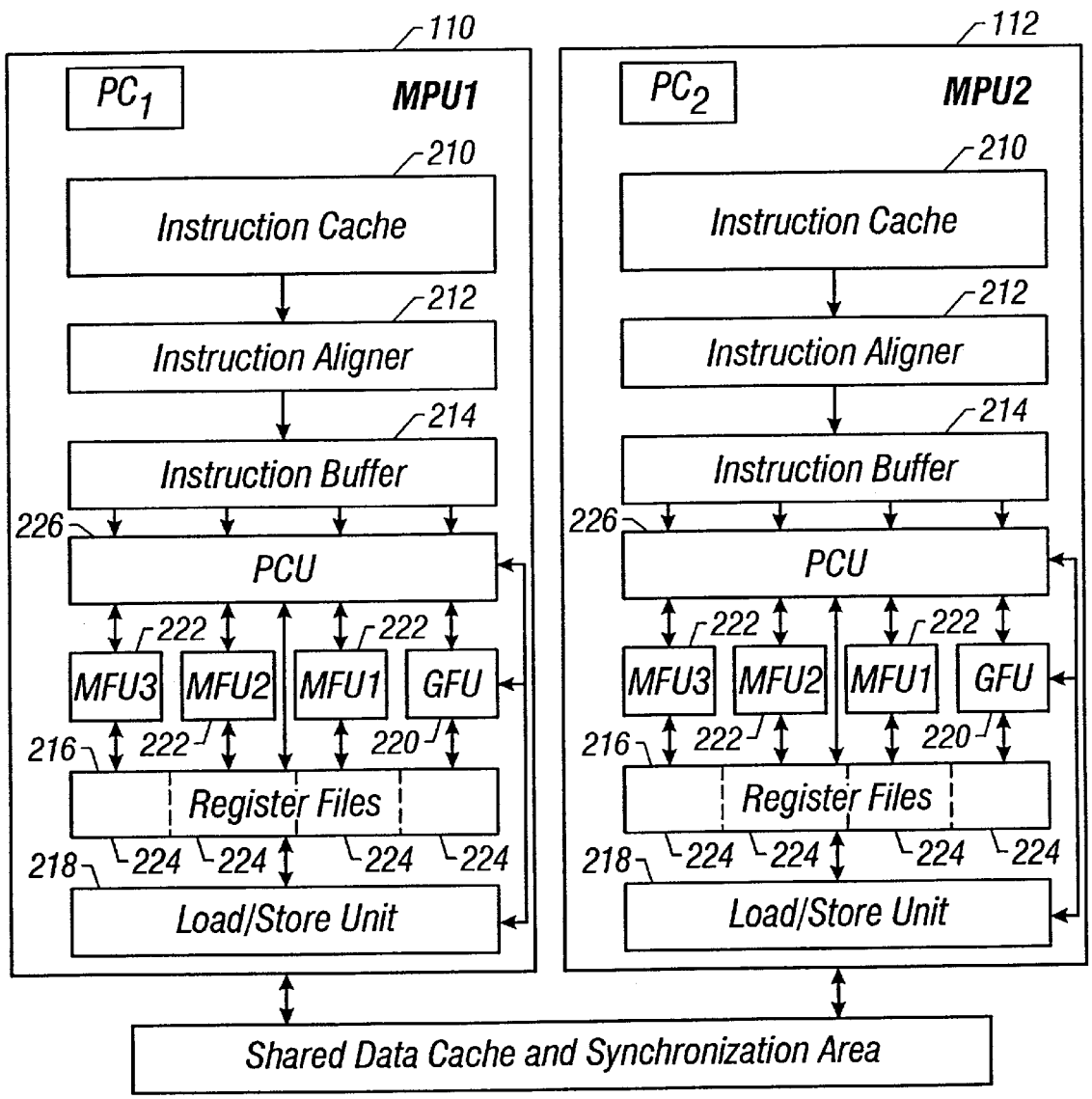
FIG. 2 is a schematic block diagram showing the core of the processor.

Referring to FIG. 2, a schematic block diagram shows the core of the processor 100. The media processing units 110 and 112 each include an instruction cache 210, an instruction aligner 212, an instruction buffer 214, a pipeline control unit 226, a split register file 216, a plurality of execution units, and a load/store unit 218. In the illustrative processor 100, the media processing units 110 and 112 use a plurality of execution units for executing instructions. The execution units for a media processing unit 110 include three media functional units (MFU) 222 and one general functional unit (GFU) 220. The media functional units 222 are multiple single-instruction-multiple-datapath (MSIMD) media functional units. Each of the media functional units 222 is capable of processing parallel 16-bit components. Various parallel 16-bit operations supply the single-instruction-multiple-datapath capability for the processor 100 including add, multiply-add, shift, compare, and the like. The media functional units 222 operate in combination as tightly-coupled digital signal processors (DSPs). Each media functional unit 222 has an separate and individual sub-instruction stream, but all three media functional units 222 execute synchronously so that the subinstructions progress lock-step through pipeline stages.

The general functional unit 220 is a RISC processor capable of executing arithmetic logic unit (ALU) operations, loads and stores, branches, and various specialized and esoteric functions such as parallel power operations, reciprocal squareroot operations, and many others. The general functional unit 220 supports less common parallel operations such as the parallel reciprocal square root instruction.

The illustrative instruction cache 210 has a 16 Kbyte capacity and includes hardware support to maintain coherence, allowing dynamic optimizations through self-modifying code. Software is used to indicate that the instruction storage is being modified when modifications occur. The 16K capacity is suitable for performing graphic loops, other multimedia tasks or processes, and general-purpose Java™ code. Coherency is maintained by hardware that supports write-through, non-allocating caching. Self-modifying code is supported through explicit use of "store-to-instruction-space" instructions store2i. Software uses the store2i instruction to maintain coherency with the instruction cache 210 so that the instruction caches 210 do not have to be snooped on every single store operation issued by the media processing unit 110.

The pipeline control unit 226 is connected between the instruction buffer 214 and the functional units and schedules the transfer of instructions to the functional units. The pipeline control unit 226 also receives status signals from the functional units and the load/store unit 218 and uses the status signals to perform several control functions. The pipeline control unit 226 maintains a scoreboard, generates stalls and bypass controls. The pipeline control unit 226 also generates traps and maintains special registers.

Each media processing unit 110 and 112 includes a split register file 216, a single logical register file including 128 thirty-two bit registers. The split register file 216 is split into a plurality of register file segments 224 to form a multi-ported structure that is replicated to reduce the integrated circuit die area and to reduce access time. A separate register file segment 224 is allocated to each of the media functional units 222 and the general functional unit 220. In the illustrative embodiment, each register file segment 224 has 128 32-bit registers. The first 96 registers (0–95) in the register file segment 224 are global registers. All functional units can write to the 96 global registers. The global registers are coherent across all functional units (MFU and GFU) so that any write operation to a global register by any functional unit is broadcast to all register file segments 224. Registers 96–127 in the register file segments 224 are local registers. Local registers allocated to a functional unit are not accessible or "visible" to other functional units.

The media processing units 110 and 112 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach that avoids hardware interlocks to account for software that does not schedule operations properly. Such hardware interlocks are typically complex, error-prone, and create multiple critical paths. A VLIW instruction word always includes one instruction that executes in the general functional unit (GFU) 220 and from zero to three instructions that execute in the media functional units (MFU) 222. A MFU instruction field within the VLIW instruction word includes an operation code (opcode) field, three source register (or immediate) fields, and one destination register field.

Instructions are executed in-order in the processor 100 but loads can finish out-of-order with respect to other instructions and with respect to other loads, allowing loads to be moved up in the instruction stream so that data can be streamed from main memory. The execution model eliminates the usage and overhead resources of an instruction window, reservation stations, a re-order buffer, or other blocks for handling instruction ordering. Elimination of the instruction ordering structures and overhead resources is highly advantageous since the eliminated blocks typically consume a large portion of an integrated circuit die. For example, the eliminated blocks consume about 30% of the die area of a Pentium II processor.

To avoid software scheduling errors, the media processing units 110 and 112 are high-performance but simplified with respect to both compilation and execution. The media processing units 110 and 112 are most generally classified as a simple 2-scalar execution engine with full bypassing and hardware interlocks on load operations. The instructions include loads, stores, arithmetic and logic (ALU) instructions, and branch instructions so that scheduling for the processor 100 is essentially equivalent to scheduling for a simple 2-scalar execution engine for each of the two media processing units 110 and 112.

The processor 100 supports full bypasses between the first two execution units within the media processing unit 110 and 112 and has a scoreboard in the general functional unit 220 for load operations so that the compiler does not need to handle nondeterministic latencies due to cache misses. The processor 100 scoreboards long latency operations that are executed in the general functional unit 220, for example a reciprocal square-root operation, to simplify scheduling across execution units. The scoreboard (not shown) operates by tracking a record of an instruction packet or group from the time the instruction enters a functional unit until the instruction is finished and the result becomes available. A VLIW instruction packet contains one GFU instruction and from zero to three MFU instructions. The source and destination registers of all instructions in an incoming VLIW instruction packet are checked against the scoreboard. Any true dependencies or output dependencies stall the entire packet until the result is ready. Use of a scoreboarded result as an operand causes instruction issue to stall for a sufficient number of cycles to allow the result to become available. If the referencing instruction that provokes the stall executes on the general functional unit 220 or the first media functional unit 222, then the stall only endures until the result is available for intra-unit bypass. For the case of a load instruction that hits in the data cache 106, the stall may last only one cycle. If the referencing instruction is on the second or third media functional units 222, then the stall endures until the result reaches the writeback stage in the pipeline where the result is bypassed in transmission to the split register file 216.

The scoreboard automatically manages load delays that occur during a load hit. In an illustrative embodiment, all loads enter the scoreboard to simplify software scheduling and eliminate NOPs in the instruction stream.

The scoreboard is used to manage most interlocks between the general functional unit 220 and the media functional units 222. All loads and non-pipelined long-latency operations of the general functional unit 220 are scoreboarded. The long-latency operations include division idiv,fdiv instructions, reciprocal squareroot frecsqrt,precsqrt instructions, and power ppower instructions. None of the results of the media functional units 222 is scoreboarded. Non-scoreboarded results are available to subsequent operations on the functional unit that produces the results following the latency of the instruction.

The illustrative processor 100 has a rendering rate of over fifty million triangles per second without accounting for operating system overhead. Therefore, data feeding specifications of the processor 100 are far beyond the capabilities of cost-effective memory systems. Sufficient data bandwidth is achieved by rendering of compressed geometry using the geometry decompressor 104, an on-chip real-time geometry decompression engine. Data geometry is stored in main memory in a compressed format. At render time, the data geometry is fetched and decompressed in real-time on the integrated circuit of the processor 100. The geometry decompressor 104 advantageously saves memory space and memory transfer bandwidth. The compressed geometry uses an optimized generalized mesh structure that explicitly calls out most shared vertices between triangles, allowing the processor 100 to transform and light most vertices only once. In a typical compressed mesh, the triangle throughput of the transform-and-light stage is increased by a factor of four or more over the throughput for isolated triangles. For example, during processing of triangles, multiple vertices are operated upon in parallel so that the utilization rate of resources is high, achieving effective spatial software pipelining. Thus operations are overlapped in time by operating on several vertices simultaneously, rather than overlapping several loop iterations in time. For other types of applications with high instruction level parallelism, high trip count loops are software-pipelined so that most media functional units 222 are fully utilized.

Figure 3:
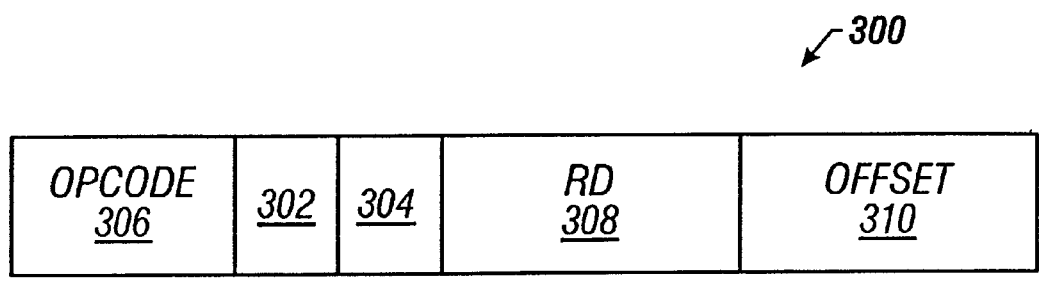
FIG. 3 shows a format of a branch instruction in accordance with one embodiment of the present invention.

FIG. 3 shows a format of a branch instruction in accordance with one embodiment of the present invention. The branch instruction 300 includes a bit 302 for indicating that the branch is easy to predict (e.g., 0) or hard to predict (e.g., 1). The branch instruction includes a bit 304 for indicating a software branch prediction that the branch is taken (e.g., 0) or not taken (e.g., 1). The software branch prediction loaded in bit 304 is used to predict the outcome of the branch if the branch is easy to predict (e.g., bit 302 is set to 0). Branch instruction 300 also includes opcode 306, which corresponds to the opcode for a branch instruction, destination portion 308, which sets forth the destination register (e.g., where the condition resides), and relative offset portion 310, which sets forth the relative offset of the branch target when the branch is taken.

Accordingly, software branch prediction filtering migrates some of the complexity associated with conditional branches to the compiler. It is observed that, for example: graphics code has few branches, or very predictable branches; JAVA applications have more unconditional branches than typical C or Fortran applications (mainly due to the extensive usage of jumps or calls); a dynamic compiler has better observability and has the capability to update software-controlled prediction bits; software branch prediction with simple heuristics can predict branches successfully >75% of the time, or possibly even >83% for brute force heuristics. See, e.g., Thomas Ball, James Larus, *Branch Prediction for Free, Programming Languages Design & Implementation,* 1993, New Mexico, pp300–312.

Based on these observations, branch instructions have 2 bits that the compiler can set to let the processor know (a) if the branch is easy or hard to predict, and (b) the branch is predicted taken, which is a software branch prediction (e.g., determined by the compiler at compile time). In this way, when the microprocessor encounters an easy-to-predict branch, it simply uses the software branch prediction provided by the other bit. On the other hand, when the microprocessor encounters a hard-to-predict branch, it can use a simple hardware-based branch prediction or a more robust hardware-based branch prediction. In this way it is possible to dedicate a hardware-based branch prediction mechanism only to those branches that the software cannot predict very well. Measurements show that a reduction of the number of mispredictions between 20–40 percent is achievable. Alternately, the prediction efficiency can be kept at the same level, while the size of the branch prediction table can be reduced.

Figure 4:
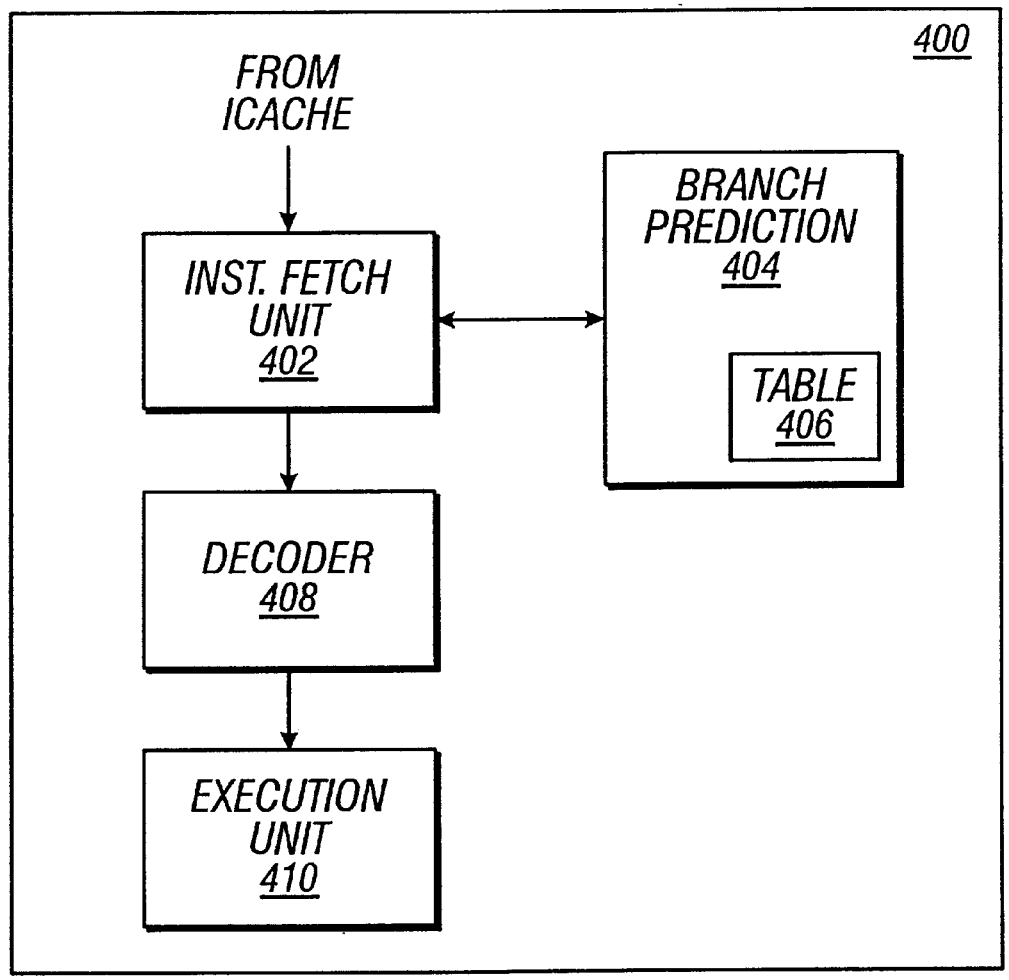
FIG. 4 is a block diagram of an implementation of the branch instruction of FIG. 3 in accordance with one embodiment of the present invention.

FIG. 4 is a block diagram of an implementation of the branch instruction of FIG. 3 in accordance with one embodiment of the present invention. MPU 400 includes an instruction fetch unit 402, which fetches instruction data from an instruction cache unit 210 (see FIG. 2). Instruction fetch unit 402 is coupled to a branch prediction circuit 404. Branch prediction circuit 404 includes a branch prediction table 406, such as a conventional 512-entry branch prediction table. Instruction fetch unit 402 is also coupled to a decoder 408, which decodes an instruction for execution by execution unit 410. One of ordinary skill in the art will recognize that there are various way to implement the circuitry and logic for performing the branch prediction operation in a microprocessor, such as a pipelined microprocessor.

Figure 5:
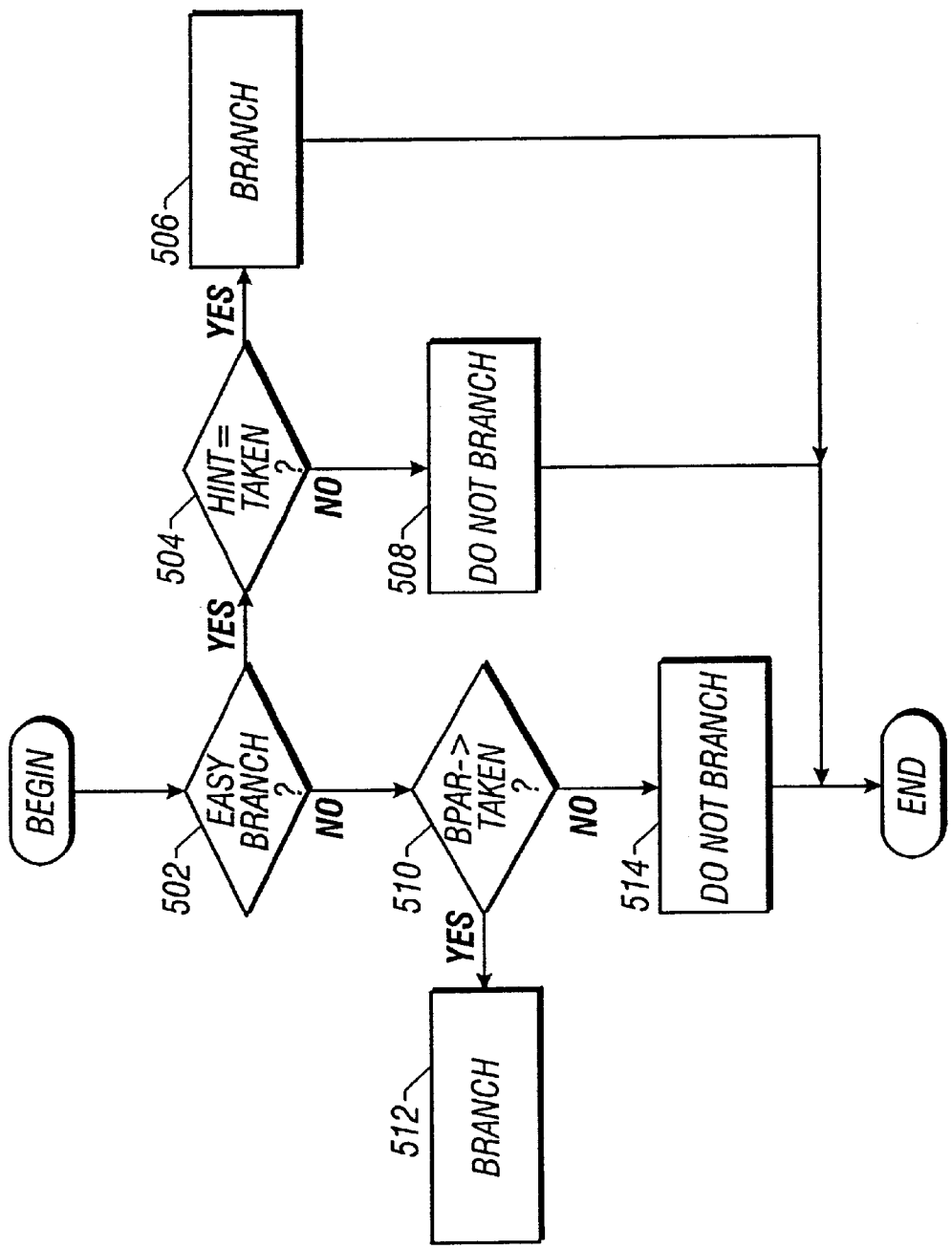
FIG. 5 is a flow diagram of the operation of the branch instruction of FIG. 3 in accordance with one embodiment of the present invention.

FIG. 5 is a flow diagram of the operation of the branch instruction of FIG. 3 in accordance with one embodiment of the present invention. The operation of the branch instruction begins at stage of operation 502. At stage 502, whether the branch is easy to predict is determined. If so, then software branch prediction is used to predict whether the branch is taken. At stage 504, whether the software branch prediction predicts that the branch is taken is determined. If so, then the branch is taken at stage 506. Otherwise, the branch is not taken at stage 508.

Otherwise (i.e., the branch is hard to predict), a hardware branch prediction mechanism (e.g., the branch prediction circuit 404 of FIG. 4) is used to determine if the branch is predicted to be taken. If the branch is predicted taken by the hardware branch prediction circuit 404 (e.g., branch prediction array (bpar)), then the branch is taken at stage 512 (e.g., the offset is added to the current program counter to provide a new address sequence to be fetched). Otherwise, the branch is not taken at stage 514 (e.g., the present instruction stream is continued in sequence).

In one embodiment, a branch misprediction by the software branch prediction causes a modification of the software branch prediction bit (e.g., toggles bit 304 of FIG. 3 using self-modifying code). A hardware branch misprediction causes a modification in the hardware branch prediction table (e.g., an entry in branch prediction table 406 of FIG. 4 is modified).

In one embodiment, the software branch prediction utilizes heuristics involving code analysis such as that set forth in Ball et al.

In one embodiment, the hardware branch prediction utilizes the following branch prediction scheme:
   if offset<0 (backward branch) then predict taken
   else (i.e., offset>0) (forward branch) predict not taken.

The displacement of an unconditional branch is treated as an offset and added to the program counter (not shown) to form the target address of the next instruction if the branch is taken. Alternatively, a more robust hardware branch prediction approach utilizes a branch prediction table (e.g., 512-entry branch prediction table) and associates a state machine to each branch. For example, a 2-bit counter is used to describe four states: strongly taken, likely taken, likely not taken, and strongly not taken. The branch prediction table is implemented as a branch prediction array.

In one embodiment, a JIT compiler for JAVA™ source code provides software branch prediction (e.g., sets bit 304) and indicates whether a compiled branch is easy to predict or hard to predict (e.g., sets bit 302). The software branch prediction filtering can reduce misprediction rates by about 25% and considering that about 20% of compiled JAVA™ code can be branches, this embodiment provides a significant improvement. The present invention can also be applied to statically compiled C code or to static compilation of other computer programming languages. Also, this approach reduces the risk of polluting the hardware branch prediction table by conserving the hardware branch prediction table for hard-to-predict branches.

Although particular embodiments of the present invention have been shown and described, it will be obvious to those skilled in the art that changes and modifications can be made without departing from the present invention in its broader aspects. For example, different approaches to software branch prediction and to hardware branch prediction can be used. Also, dynamic software branch prediction or dynamic hardware branch prediction (or both) can be utilized in accordance with one embodiment of the present invention. The present invention is not limited by any particular processor architecture, the presence or structure of caches or memory, or the number of bits in any register or memory location. Therefore, the appended claims are to encompass within their scope all such changes and modifications that fall within the true scope of the present invention.

What is claimed is:

1. A process for software branch prediction filtering for a microprocessor, comprising:
   determining whether the branch is easy to predict; and
   dynamically predicting the branch using software branch prediction if the branch is easy to predict.
2. The process of claim 1 further comprising:
   predicting the branch using hardware branch prediction if the branch is hard to predict.
3. The process of claim 2 further comprising:
   checking a first bit of an instruction that indicates whether the branch is easy to predict or hard to predict.
4. The process of claim 3 further comprising:
   checking a second bit of the instruction that indicates whether the branch is predicted taken or not taken by the software branch prediction.
5. The process of claim 4 further comprising:
   modifying the second bit if the software branch prediction mispredicts the branch.
6. The process of claim 3 wherein the first bit is set by a compiler that compiled the instruction.
7. The process of claim 6 wherein the compiler is a Java™ Just-In-Time compiler.
8. The process of claim 2 further comprising:
   modifying a branch prediction table if the hardware branch prediction mispredicts the branch.
9. The process of claim 8 wherein the hardware branch prediction comprises incrementing and decrementing a counter based on a state machine.
10. The process of claim 1 wherein the software branch prediction comprises utilizing heuristics.
11. An apparatus for software branch prediction filtering for a microprocessor, comprising:
    branch prediction circuitry, the branch prediction circuitry comprising a branch prediction table; and
    software branch prediction filtering logic coupled to the branch prediction circuitry, the software branch prediction filtering logic executing a branch instruction and determining whether the branch is easy to predict, and the software branch prediction filtering logic dynamically predicting the branch using the software branch prediction if the branch is easy to predict.
12. The apparatus of claim 11, wherein the software branch prediction filtering logic further comprises predicting the branch using the hardware branch prediction circuitry if the branch is hard to predict.
13. The apparatus of claim 12 wherein a first bit of the branch instruction provides an indication of whether the branch is easy to predict, and a second bit provides an indication of the software branch prediction.
14. The apparatus of claim 13 wherein the software branch prediction filtering logic further comprises modifying the second bit if the software branch prediction mispredicts the branch.
15. The apparatus of claim 14 wherein the hardware branch prediction circuitry comprises a 512-entry branch prediction table.
16. The apparatus of claim 15 wherein the branch instruction comprises a compiled Java™ instruction.
17. An apparatus that performs software branch prediction filtering for a microprocessor, comprising:
    means for determining whether the branch is easy to predict; and
    means for dynamically predicting the branch using software prediction if the branch is easy to predict.
18. The apparatus of claim 17 further comprising:
    means for predicting the branch using hardware branch prediction if the branch is hard to predict.
19. The apparatus of claim 18 further comprising:
    means for checking a first bit of an instruction that indicates whether the branch is easy to predict or hard to predict.
20. The apparatus of claim 19 further comprising:
    means for checking a second bit of the instruction that indicates whether the branch is predicted taken or not taken by the software branch prediction.
21. The apparatus of claim 20 further comprising:
    means for dynamically modifying the second bit if the software branch prediction mispredicts the branch.
22. The apparatus of claim 19, further comprising:
    means for setting the first bit.
23. The apparatus for claim 22 wherein means for setting the first bit is a Java™ Just-In-Time compiler.
24. The apparatus of claim 18 further comprising:
    means for modifying a branch prediction table if the hardware branch prediction mispredicts the branch.
25. The apparatus of claim 24 wherein the hardware branch prediction comprises means for incrementing and decrementing a counter based on a state machine.
26. The apparatus of claim 17 wherein the means for dynamically predicting the branch comprises means for performing heuristics.
27. An apparatus that performs software branch prediction filtering for a microprocessor, comprising:
    means for determining whether the branch is easy to predict; and means for predicting the branch using software branch prediction if the branch is easy to predict.

28. The apparatus of claim 27 further comprising:

means for predicting the branch using hardware branch prediction if the branch is hard to predict.

29. The apparatus of claim 28 further comprising:

means for checking a first bit of an instruction that indicates whether the branch is easy to predict or hard to predict.

30. The apparatus of claim 29 further comprising:

means for checking a second bit of the instruction that indicates whether the branch is predicted taken or not taken by the software branch prediction.

31. The apparatus of claim 30 further comprising:

means for modifying the second bit if the software branch prediction mispredicts the branch.

32. The apparatus of claim 29, further comprising:

means for setting the first bit.

33. The apparatus of claim 32 wherein the means for setting the first bit is a Java™ Just-In-Time compiler.

34. The apparatus of claim 28 further comprising:

means for modifying a branch prediction table if the hardware branch prediction mispredicts the branch.

35. The apparatus of claim 34 wherein the hardware branch prediction comprises incrementing and decrementing a counter based on a state machine.

36. The apparatus of claim 27 wherein the means for predicting the branch comprises means for performing heuristics.

* * * * *

UNITED STATES PATENT AND TRADEMARK OFFICE
CERTIFICATE OF CORRECTION

PATENT NO. : 6,374,351 B2
DATED : April 16, 2002
INVENTOR(S) : Marc Tremblay

It is certified that error appears in the above-identified patent and that said Letters Patent is hereby corrected as shown below:

<u>Column 10,</u>
Line 35, before the word "prediction", insert the word -- branch --.
Line 53, delete the word "for" before "Claim 22" and insert the word -- of --.

Signed and Sealed this

Fifteenth Day of April, 2003

JAMES E. ROGAN
*Director of the United States Patent and Trademark Office*